United States Patent [19]
Fleming et al.

[11] Patent Number: 4,797,271
[45] Date of Patent: * Jan. 10, 1989

[54] PRODUCING ALUMINA GRANULES IN A FLUIDIZED BED

[75] Inventors: Hubert L. Fleming, Mars; Jon F. Edd, Monroeville; Alan Pearson, Murrysville, all of Pa.; Chin-Liang Chou, Terre Haute, Ind.; Hisashi O. Kono; Ching-Chung Huang, both of Morgantown, W. Va.

[73] Assignee: Aluminum Company of America, Pittsburgh, Pa.

[*] Notice: The portion of the term of this patent subsequent to Nov. 3, 2004 has been disclaimed.

[21] Appl. No.: 111,218

[22] Filed: Oct. 22, 1987

Related U.S. Application Data

[63] Continuation-in-part of Ser. No. 16,631, Feb. 19, 1987, Pat. No. 4,704,378.

[51] Int. Cl.$^4$ ............................................. C01F 7/02
[52] U.S. Cl. ................................... 423/625; 502/355; 502/415; 502/439; 23/313 FB
[58] Field of Search .............. 423/624, 625, 627, 628, 423/626; 502/415, 355, 439; 23/313 FB; 501/153

[56] References Cited

U.S. PATENT DOCUMENTS

| | | | |
|---|---|---|---|
| 1,953,201 | 4/1934 | Tosterud | 423/625 |
| 2,876,068 | 3/1959 | Tertian et al. | 423/628 |
| 2,881,051 | 4/1959 | Pingard | 423/628 |
| 2,915,365 | 12/1959 | Saussol | 423/628 |
| 3,222,129 | 12/1965 | Osment et al. | 423/628 |
| 3,223,483 | 12/1965 | Osement | 423/131 |
| 3,231,413 | 1/1966 | Berquin | 427/213 |
| 3,275,405 | 9/1966 | Clark | 423/625 |
| 3,480,389 | 11/1969 | Graulier | 423/626 |
| 3,628,914 | 12/1971 | Graulier | 423/625 |
| 3,701,718 | 10/1972 | Papee et al. | 423/628 |
| 3,856,708 | 12/1974 | Carithers | 252/463 |
| 3,898,322 | 8/1975 | Leach | 423/625 |
| 3,919,117 | 11/1975 | Michalko | 252/448 |
| 3,958,341 | 5/1976 | Podschus | 423/628 |
| 4,120,826 | 10/1978 | Ebel et al. | 252/465 |
| 4,120,942 | 10/1978 | Spitzer et al. | 423/626 |
| 4,124,699 | 11/1978 | Michel et al. | 423/628 |
| 4,166,100 | 8/1979 | Vorobiev et al. | 423/626 |
| 4,169,874 | 10/1979 | Bambrick | 423/628 |
| 4,579,839 | 4/1986 | Pearson | 502/439 |
| 4,704,378 | 11/1987 | Fleming et al. | 502/355 |

OTHER PUBLICATIONS

"Fluidized-Bed Spray Granulation" by Sten Mortensen and Svend Hovmand, CEP, Apr. 3, 1983, pp. 37-42.

Primary Examiner—Robert L. Stoll
Assistant Examiner—Paige C. Harvey
Attorney, Agent, or Firm—Douglas G. Glantz

[57] ABSTRACT

The process of the present invention for preparing granules of alumina includes pretreating an alumina powder by admixing with cold water in a mixer at a temperture below room temperature, e.g., such as below about 20° C., to form a pretreated alumina having a pore volume saturated with water and further having a surface area of gel structure, and agglomerating the pretreated alumina in a fluidized bed to form granules. The process is particularly suite to producing activated alumina in macroporous granules. The process in one aspect further includes a cold hopper for cooling alumina powder prior to the pretreating step.

20 Claims, 3 Drawing Sheets

PORE VOLUME DISTRIBUTIONS FOR ACTIVATED ALUMINAS

PORE VOLUME DISTRIBUTIONS FOR FLUIDIZED BED GRANULES

PRODUCING ALUMINA GRANULES IN A FLUIDIZED BED

CROSS-REFERENCE TO RELATED PATENT APPLICATION

This application is a continuation-in-part application of U.S. Ser. No. 16,631 filed Feb. 19, 1987, now U.S. Pat. No. 4,704,378 issued Nov. 3, 1987.

BACKGROUND OF THE INVENTION

This invention relates to the granulation of rehydratable alumina in small particle sizes.

Alumina, as a chemical compound by itself or in combination with one or more other refractory inorganic oxides, is widely employed in industrial process applications as a catalyst, as a catalyst base, as a support or chemical carrier material, or as an adsorbent. The granulation of alumina powders to form granular aluminas is one of the crucial tasks in preparing alumina for one of the various types of industrial process applications. Granulation improves the bulk properties of the alumina in particulate form. The substitution of granular aluminas for fine powders can create beneficial effects including improved pore structure, improved flow properties, reduced dusting loss, and improved product appearance. The beneficiation of granulation can be accomplished by techniques classified into several categories according to the principal method used for the beneficiation including, e.g., agitation in a tumbling drum, pressure, thermal, spray in a fluidized bed, and agglomeration from liquids by an oil drop method. As each method is different in technique of beneficiation, the resulting granular product also is characteristically different in properties.

In the granulation of powdered materials, binding is partially achieved by liquid-solid capillary energy reduction. In both alumina granulation and alumina hydrate granulation, water sometimes has been used as the liquid binder.

Alumina has numerous crystalline forms. Strictly speaking, so-called "activated" alumina includes eta, chi, gamma, and rho-alumina, of which the specific surfaces are in the range of about 100-400 m$^2$/g. These activated alumina forms are important substrates for the various industrial process applications. Activated alumina generally is produced by dehydration reactions from alumina hydrate such as gibbsite, bayerite, boehmite, and an amorphous gel. The alumina hydrates can be cnverted into various forms of alumina depending on dehydration conditions.

It is an object of the present invention to prepare small granules of activated alumina.

It is another object of the present invention to prepare activated alumina having a high surface area and small granular particle size.

It is yet another object of the present invention to prepare an activated eta-alumina or gamma-alumina having a high surface area in a small granular particle size.

SUMMARY OF THE INVENTION

The process of the present invention for preparing granules of alumina includes pretreating an alumina powder by admixing with cold water in a mixer at a temperature below room temperature, e.g., such as below about 20° C., to form a pretreated alumina having a pore volume saturated with water and further having a surface area of gel structure, and agglomerating the pretreated alumina in a fluidized bed to form granules. The process is particularly suited to producing activated alumina in macroporous granules. The process in one aspect further includes a cold hopper for cooling alumina powder prior to the pretreating step.

DETAILED DESCRIPTION

Figure 1:
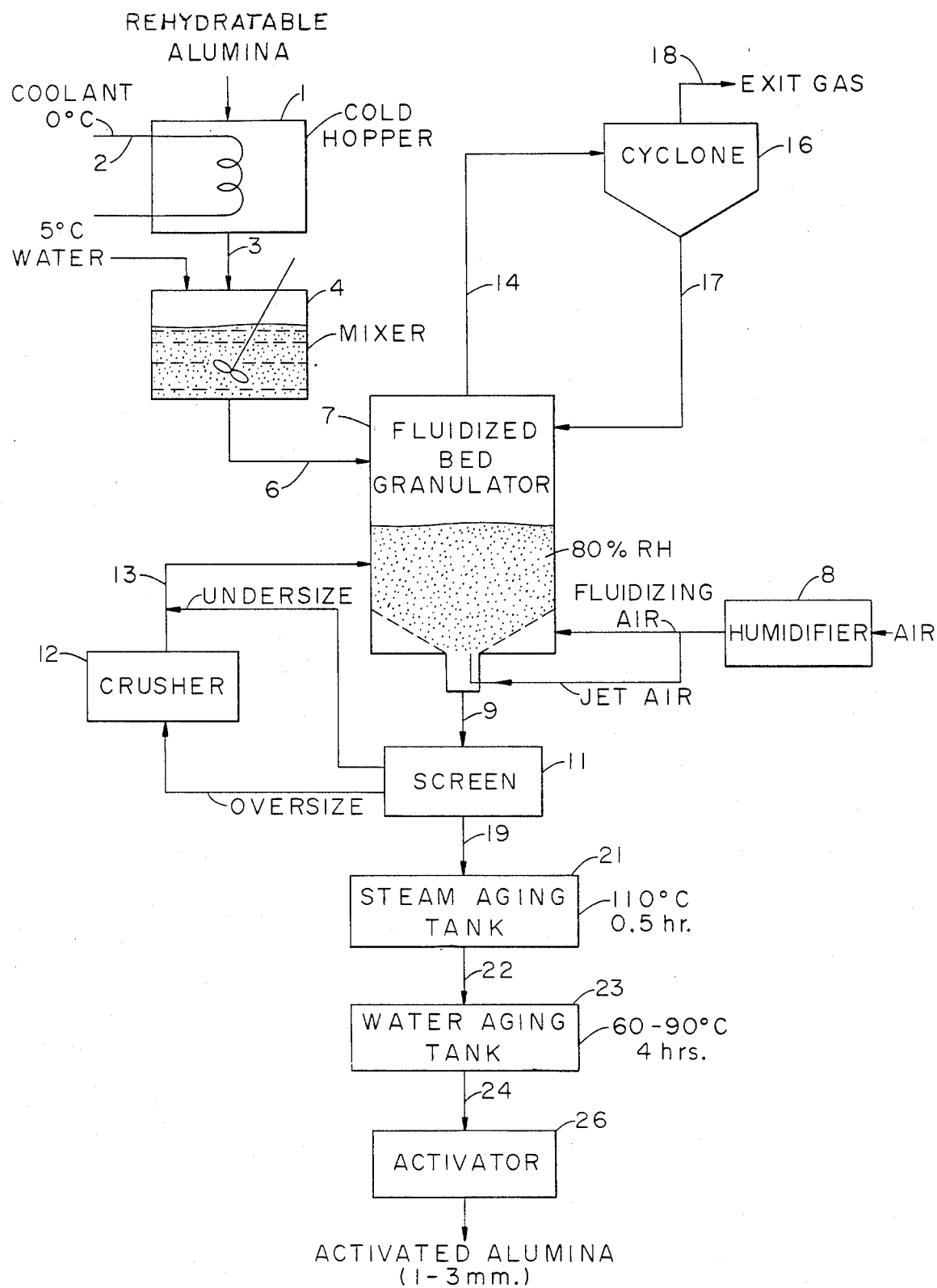
FIG. 1 depicts a schematic process for carrying out the process of the present invention.

Referring now to FIG. 1, rehydratable alumina is fed as shown to cold hopper 1 where the alumina is cooled to a temperature below room temperature, e.g., such as below about 20° C. The alumina is cooled in cold hopper 1 to a temperature preferably in the range of about 5°-10° C., and more preferably, to a temperature of about 5° C. Coolant at a temperature of about 0° C. is passed in line 2 to provide cooling for cold hopper 1. Cooled powder is then passed from cold hopper 1 through line 3 to mixer 4. Water also is fed as shown to mixer 4 at a temperature below room temperature, e.g., such as below about 20° C., preferably at a temperature in the range of about 5°-10° C., and more preferably at a temperature of about 5° C.

The first step of the process of the present invention generally takes place in mixer 4 and includes pretreating the alumina powder by admixing the powder with the cold water fed to the mixer at a temperature below room temperature, e.g., below about 20° C., preferably at a temperature in the range of about 5°-10° C., and more preferably at a temperature of about 5° C. A cooling jacket (not shown) can be used in conjunction with mixer 4 for cooling the content therein during mixing. Such a cooling jacket can use a water bath for cooling mixer 4. The pretreatment step carried out in mixer 4 preferably includes mixing alumina powder and water in a ratio of about 2:1 by weight. The pretreatment step is performed in such a way to saturate the pore volume of the alumina partially with water and to form a surface layer on the alumina in the form of a gel or gel-like structure. The pretreatment step is carried out in such a way not to rehydrate the powder extensively.

Pretreated alumina from mixer 4 is fed in line 6 to a spouted fluidized bed granulator 7. The operation of the fluidized bed granulator 7 includes maintaining a constant superficial velocity of fluidizing air fed as shown to the fluidized bed. Preferably, air making up the fluidized air consists of air having a high relative humidity of 80% or greater. The high relative humidity air is supplied by feeding air as shown to humidifier 8 prior to feeding fluidized air at the proper relative humidity to fluidized bed granulator as shown. A portion of the high relative humidity air preferably is used to provide a spouted jet air stream as shown in the fluidized bed granulator unit (FBG) of FIG. 2 to maintain better circulation of solids in the bed. It has been found that 20–70% of the total air introduced as feed into the fluidized bed should be introduced as the jet air as shown. Nevertheless, the constant superficial velocity of air should be maintained at about 0.8 to 1.4 m/sec, preferably at about 1.1 m/sec in fluidized bed granulator 7 for particle sizes in the range of about 1–3 mm. At velocities below 0.8 m/sec, growth rate is undesirably slow. At velocities higher than 1.4 m/sec, entrainment problems affect the stability of the fluidized bed. The preferred velocity will vary directly with the particle size to be produced. The high relative humidity air used as fluidizing air and as jet air is controlled to have 80% or higher relative humidity to reduce the loss of water from the bed while the alumina is agglomerating.

Residence time in the fluidized bed is maintained between about 10–60 minutes. The specific residence time within the specified range depends upon the desired size distribution. Granules growing beyond the size supported by the incoming fluidized air are withdrawn through the bottom of the bed in line 9, along with the agglomerated granules. In one aspect, the granules are produced by the instant process sized in the range of about 1–3 mm diameter in accordance with this one aspect of the present invention of forming agglomerated granules.

Agglomerates withdrawn from the fluidized bed granulator in line 9 are passed to screen 11 to be screened into desirable products. Oversize agglomerates are withdrawn as shown from screen unit 11 and fed to crusher 12. The oversized agglomerates are crushed in crusher 12 and passed in line 13 to be used as seeds in the fluidized bed granulator. Optionally, the crushed oversized agglomerate can be recirculated (not shown) to screen 11. Undersized agglomerates from screen 11 are recycled to join line 13 and are fed back to the bed for seed feed. Carried-over fine particles from fluidized bed 7 are passed in line 14 to cyclone 16 to be captured and returned in line 17 to the fluidized bed. Fine particles escaping the cyclone in line 18 in the exit gas are removed by a wet scrubber unit (not shown).

After screening in screen 11, the granules of desired size in the range are passed in line 19 to steam aging tank 21. The granules are steam aged in tank 21, e.g., such as at a temperature of about 110° C. for about 0.5 hour and then passed in line 22 to water aging tank 23. The granules are water aged in tank 23, by way of example at a temperature of about 60°–90° C. for 4 hours. The steam aged and water aged particles then are passed in line 24 to activator 26. Activation is carried out in activator 26 to develop porosity and surface area. Activated alumina is withdrawn from activator 26 as shown.

Figure 2:
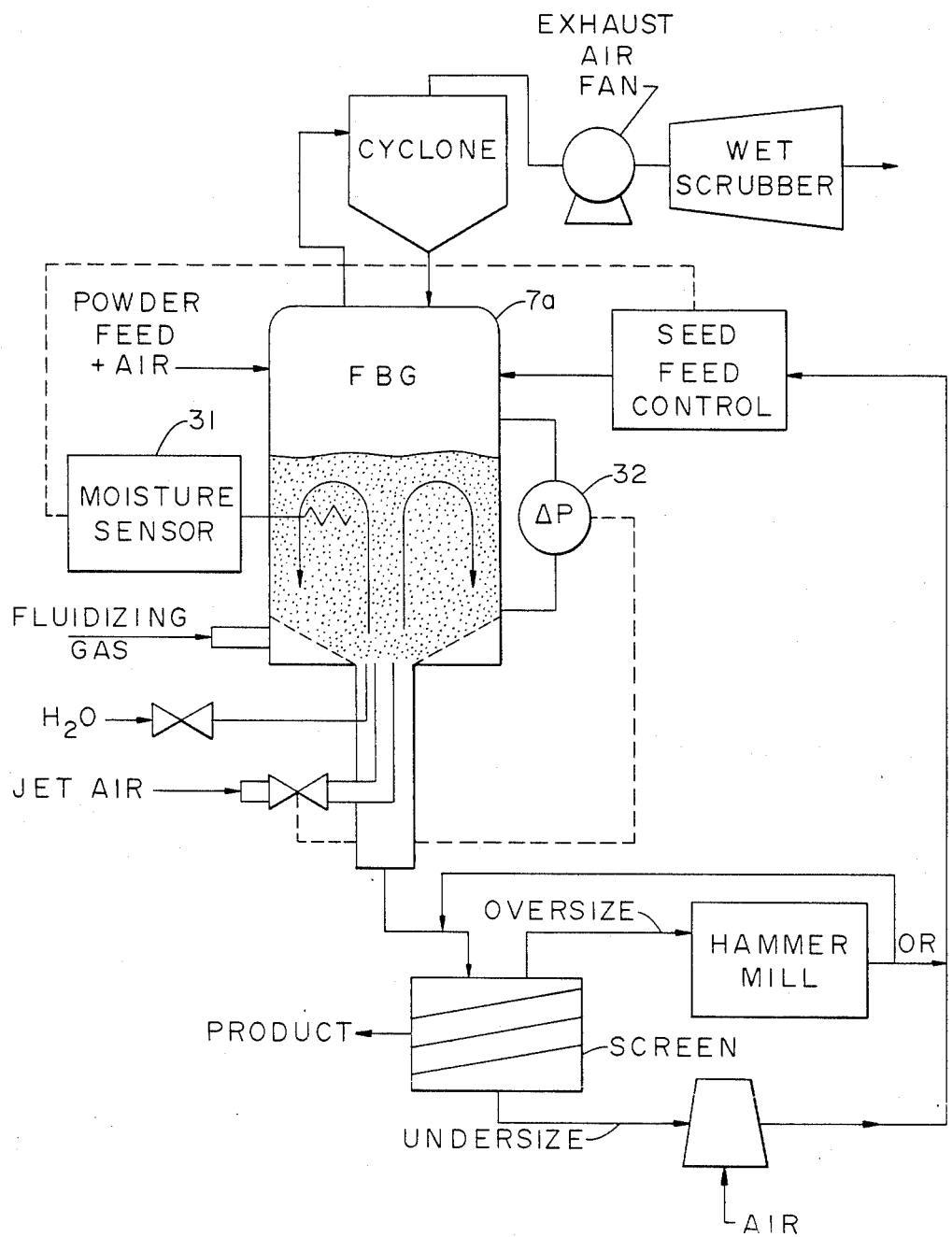
FIG. 2 depicts a schematic diagram of a fluidized bed granulator in accordance with the present invention.

Referring now to FIG. 2, a detailed diagram of fluidized bed granulation unit 7a is shown as having automatic controls including moisture sensor 31 and pressure sensor 32.

The fluidized bed granulation in one aspect of the process of the present invention provides granules of a relatively small size. By way of example, the process of the present invention can produce granules sized, in one aspect, on the order of about 1–5 mm diameter and, in another aspect, on the order of about 1–3 mm diameter. However, the specific size limitation should not be viewed as limiting the scope of the process of the present invention or its application. The fluidized bed granulation provides the further advantage of a higher one-pass efficiency than either pan or drum granulators as used in the prior art. Further, a lower rate of recirculation provides a lower capital and operational cost.

The fluidized bed granulation in the process of the present invention provides a continuous and automatic process even in a large-scale facility. Granules having a controlled pore structure are produced.

The process of the present invention including a cold pretreatment step inhibits rehydration during the granulation. Rehydration to develop solid bridges is controlled to occur only at aging under a controlled atmosphere.

It has been found that the mechanism of agglomeration in the fluidized bed in accordance with the process of the present invention enhances the formation of granules having high porosity and low density. The pore size distribution and other structural parameters of agglomerates are controlled by manipulating hydrodynamic parameters in the fluidized bed. Further, the strength of the agglomerate is closely related to pore structure. The stronger granules produced by the process of the present invention are developed by selecting the appropriate mechanism of particle growth. The fluidized bed provides the flexibility of changing turbulent fluid flow in the bed to provide the desired growth mechanism.

The fluidized bed granulation in accordance with the present invention also provides a mechanism for controlling temperature. The turbulent agitation in the bed exposes most of the surface area of the alumina for heat transfer. The high heat capacity of the bed, relative to the gas within the bed, stabilizes the temperature of the bed. The advantage of a facilitated temperature control is important to the system involving chemical reaction sensitivity to temperature changes in the bed, such as the rehydration of the alumina powder.

The process of the present invention in providing a system for operating continuously and automatically overcomes the problem in the practice of prior art processes attributable to the difficulty of process automation and control. Since agglomeration of alumina powder is sensitized to the moisture level in the bed, automation is accomplished in the process of the present invention by monitoring moisture level an controlling the population of seeds in the bed.

In practicing the process of the present invention with a fluidized bed granulator, the entrainment of fine particles in the bed requires the installation of additional equipment to recover these fine particles.

A relatively high pressure drop across the fluidized bed requires a compressor sufficient to overcome the pressure drop through the fluidized bed.

The process of the present invention including a pretreatment step for cold granulation in a fluidized bed agglomerating step has produced granules having a high total pore volume (0.7–0.863 cm$^3$/g), high macropore volume (>0.3 cm$^2$/g) low packed bulk density (0.51 g/cm$^3$ or 32 lb/ft$^3$), high surface area (320–425 m$^2$/g), good crushing strength (1–6.99 MPa), and wide pore volume distribution.

EXAMPLE 1

A rehydratable alumina constituting a median particle size of 7 microns was processed in accordance with the present invention, and the properties of the granules produced (FBG-4) were compared with two other types of agglomeration techniques based on the use of alumina having a median particle size of 5 microns. The two other types of agglomeration techniques were tumbling drum and immiscible fluid or "oil drop." The results of the property comparison are shown in Table I.

TABLE I

|  | FBG-4 | Tumbling Drum | Immiscible Fluid or Oil-Drop |
|---|---|---|---|
| He Density, g/cm$^3$ | 3.05 | — | 3.076 |
| Hg Bulk Density, g/cm$^3$ | 0.863 | — | 0.848 |
| Packed Bulk Density, g/cm$^3$ | 0.51 | 0.768 | 0.523 |
| BET Surface Area, m$^2$/g | 333 | 370 | 356 |
| Median Pore Diameter, μm | 0.064 | 0.012 | 0.0127 |
| Pore Volume, cm$^3$/g > 30Å | 0.763 | 0.404 | 0.806 |
| Total Porosity, % | 0.831 / 71.7 | 0.512 / — | 0.854 / 72.4 |
| Abrasion Loss, % | 0.56 | 0.5 | — |
| Crushing Strength, MPa | 6.99 | — | 4.71 |
| Crushing Resistance, Wt % | 90.11 | 97 | — |
| LOI, Wt % | 4.40 | 6.6 | — |

Note:
Materials activated at 425° C.

The fluidized bed granules produced in accordance with the present invention have much lower packed bulk density than granules, formed in the tumbling drum and compared favorably to oil drop balls in total pore volume, packed bulk density, and strength.

Figure 3:
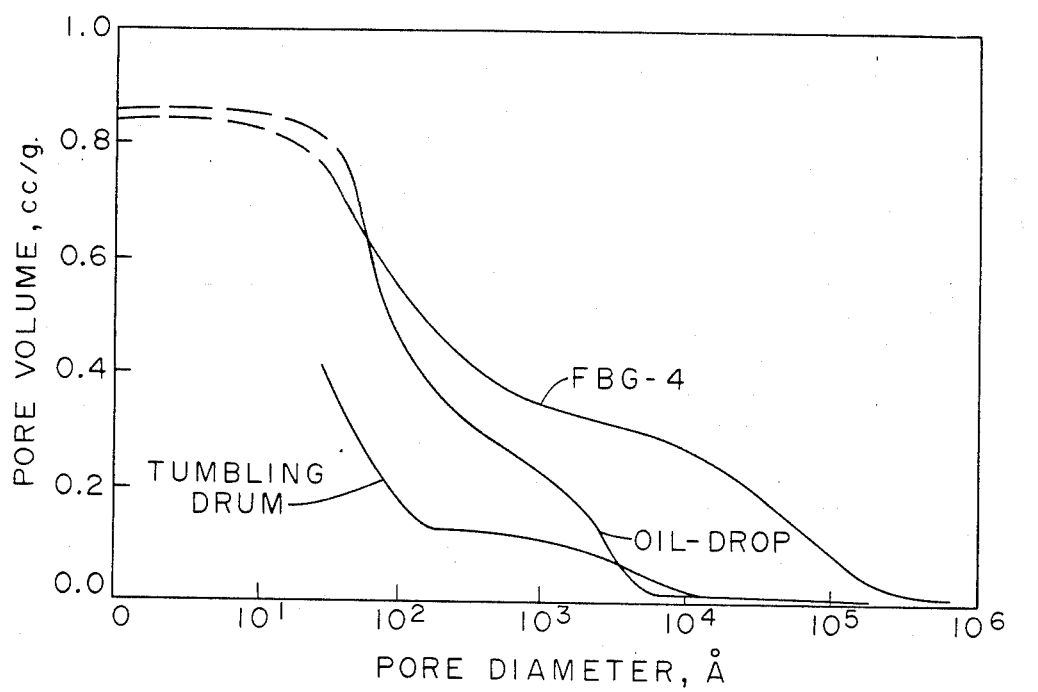
FIG. 3 shows a graphical comparison of pore volume and pore diameter for activated alumina particles prepared in accordance with the present invention compared to prior art granulation processes.

Mercury pore volume distributions for the three samples shown in Table I are depicted in FIG. 3. The granules produced in accordance with the present invention identified as FBG-4 had a much wider size distribution than that of the oil drop balls and had a larger macropore distribution (over 1,000 Angstroms).

EXAMPLE 2

Alumina granules were agglomerated in a fluidized bed, were aged, and were activated. Properties of the granules are shown in Table II.

TABLE II

|  | FBG-1 | FBG-3 | FBG-4 |
|---|---|---|---|
| He Density, g/cm$^3$ | 3.07 | 3.01 | 3.05 |
| Hg Bulk Density, g/cm$^3$ | 0.934 | 1.0626 | 0.8627 |
| Packed Bulk Density, g cm$^3$ | 0.638 | 0.65 | 0.51 |
| BET Surface Area, m$^2$/g | 416 | 326 | 333 |
| Median Pore Diameter, μm | 0.0072 | 0.0069 | 0.0636 |
| Pore Volume, cm$^3$/g > 30Å | 0.649 | 0.530 | 0.763 |
| Total Porosity, % | 0.745 / 69.6 | 0.609 / 64.7 | 0.831 / 71.7 |
| Abrasion Loss, % | — | 0.56 | — |
| Crushing Strength, MPa | — | 6.58 | 6.99 |
| Crushing Resistance, Wt % | — | 90.11 | — |
| LOI, Wt % | 5.24 | 5.62 | 4.40 |

Sample FBG-1 was prepared using 1 micron alumina as the starting material, while the rest used 7 micron alumina. Sample FBG-4 was pretreated using precooled 7 micron alumina powder and water at 5° C. and granulated at room temperature. The rest were pretreated and granulated at room temperature.

As can be seen in Table II, the properties of the cold-pretreated granules (FBG-4) are significantly different from the room temperature-pretreated granules (FBG-3). The FBG-4 has much higher total pore volume (0.831 cm$^3$/g) than that of FBG-3 (0.609 cm$^3$/g). As a result, FBG-4 has lower mercury bulk density (0.863 vs. 1.063 g/cm$^3$) and higher porosity (71.7% vs. 64.7%). Surface areas for these two samples are almost identical (333 vs. 326 m$^2$/g) despite the difference in the pore volume. Packed bulk density for FBG-4 (0.51 g/cm$^3$) is smaller than that of FBG-3 (0.65 g/cm$^3$), presumably due to low Hg bulk density and more uniform size of granules.

Figure 4:
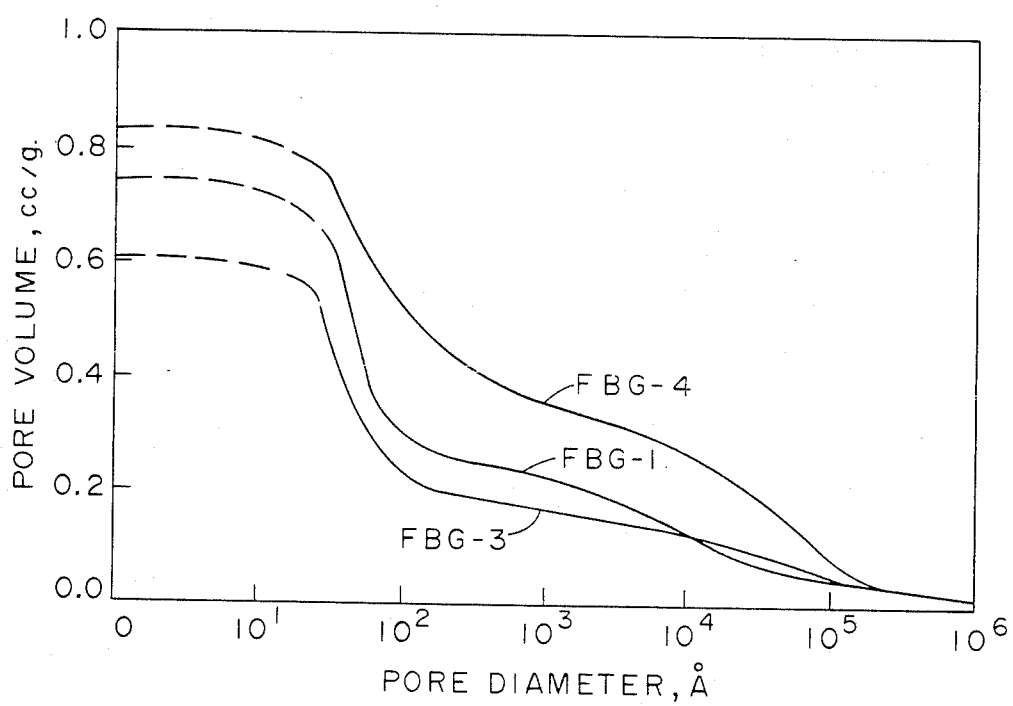
FIG. 4 shows a graphical comparison of pore volume and pore diameter for activated alumina particles prepared by fluidized bed granulation.

Comparison of the mercury pore size distributions for these samples is shown in FIG. 4. Higher pore volume for FBG-4 is attributable to the creation of macropores at 1–10 micron size range.

In Table II, the crushing strength of FBG-4 (6.99 MPa) is slightly better than that of FBG-3 (6.58 MPa) in spite of a lower density. The strength of granules is inversely proportional to the effective diameter of the secondary particles (the aggregated particles of the original CP particles after pretreatment). The pretreatment at low temperatures retards rehydration reactions. Therefore, the size of secondary particles is smaller for FBG-4 than for FBG-3, and consequently FBG-4 granules have slightly higher strength. Also, the analyses for FBG-3 show that fluidized bed granules have low abrasion loss (0.56%) and relatively high crushing resistance (90.11%).

The effects of the particle size of CP powder on the properties of the final granules can be seen by comparing sample FBG-1 with FBG-3. Granules of CP-1 (FBG-1) have significantly lower density and higher surface area than that of CP-7 (FBG-3). The total pore volume is higher for FBG-1, and the majority of pores for CP-1 granules are concentrated at the lower range of pore sizes. It was believed from observation during the experimental procedure that the strength of CP-1 granules was higher than that of CP-7 granules, though no crushing strength results are available for CP-1 granules. Mercury pore size distributions for those two samples are also shown in FIG. 4.

While the invention has been described in terms of preferred embodiments, the claims appended hereto are intended to encompass all embodiments which fall within the spirit of the invention.

What is claimed is:

1. A process for preparing granules of alumina comprising:
   (a) pretreating alumina powder by admixing said powder with cold water in a mixer at a temperature below about 20° C. to form a stabilized alumina having a pore volume partially saturated with water; and
   (b) agglomerating said pretreated alumina in a fluidized bed to form granules having a high macropore volume.

2. A process as set forth in claim 1 wherein said alumina powder consists essentially of rehydratable alumina.

3. A process as set forth in claim 2 wherein the pretreatment temperatures are controlled by using a water bath around said mixer.

4. A process as set forth in claim 3 wherein said pretreating temperature is in the range of about 5°-10° C.

5. A process as set forth in claim 4 wherein said alumina powder is cooled in a cold hopper to a temperature in the range of about 5°-10° C. prior to said pretreating step.

6. A process as set forth in claim 5 wherein said agglomerating step includes maintaining a constant superficial velocity of air in said fluidized bed.

7. A process as set forth in claim 6 wherein said superficial velocity of air is about 0.8-1.4 m/sec.

8. A process as set forth in claim 7 wherein said air has a relative humidity of 80% or higher to reduce the loss of water from the bed while agglomerating.

9. A process as set forth in claim 8 wherein said agglomerating step comprises introducing about 20-70% of the total air to the fluidized bed as a jet stream.

10. A process as set forth in claim 9 wherein residence time in the fluidized bed is between about 10-60 minutes.

11. A process as set forth in claim 10 further comprising withdrawing granules from the fluidized bed and screening the granules to separate oversize particles sized above about 3 mm diameter.

12. A process as set forth in claim 11 further comprising steam aging and water aging said particles to increase strength.

13. A process as set forth in claim 12 further comprising activating said granules by heating to develop increased porosity and surface area.

14. A process as set forth in claim 13 further comprising crushing said oversized particles and recirculating to said screening step.

15. A process as set forth in claim 15 wherein a portion of said granules sized smaller than about 1 mm diameter are fed to said fluidized bed as seed feed.

16. A process as set forth in claim 15 comprising capturing carried-over fine particles from said fluidized bed in a cyclone and returning to said fluidized bed and wet scrubbing the carried-over fine from said cyclone.

17. A process for preparing granules of alumina comprising:
(a) pretreating rehydratable alumina powder by admixing with water having a temperature in the range of about 5°-10° C. in a mixer controlled to maintain a temperature in the range of about 5°-10° C. to form a pretreated alumina having a pore volume partially saturated with water;
(b) agglomerating said pretreated alumina in a fluidized bed to form granules;
(c) withdrawing agglomerate from said fluidized bed and screening to separate granules of 1-3 mm diameter from oversize granules;
(d) crushing said oversize granules and recirculating crushed material to said fluidized bed; and
(e) steam aging, water aging, and activating said granules.

18. A process a set forth in claim 17 wherein said alumina powder is cooled in a cold hopper to a temperature in the range of 5°-10° C. prior to said pretreating step.

19. A process as set forth in claim 18 further comprising maintaining a constant superficial velocity of air in said fluidized bed.

20. A process for preparing granules of rehydratable alumina comprising:
(a) cooling rehydratable alumina powder in a cold hopper to a temperature of about 5° C. to form a cooled alumina powder;
(b) feeding said cooled alumina powder to a mixer maintained at a temperature of about 5° C.;
(c) feeding water at a temperature of about 5° C. to said mixer;
(d) mixing said powder and said water in said mixer to form a pretreated alumina having a pore volume partially saturated with water and having a surface layer of gel structure; and
(e) agglomerating said pretreated alumina in a fluidized bed to form granules.

* * * * *

UNITED STATES PATENT AND TRADEMARK OFFICE
CERTIFICATE OF CORRECTION

PATENT NO. : 4,797,271
DATED : January 10, 1989
INVENTOR(S) : Hubert L. Fleming et al It is certified that error appears in the above-identified patent and that said Letters Patent is hereby corrected as shown below:

| | |
|---|---|
| Abstract, line 3 | Change "temperture" to --temperature--. |
| Abstract, line 9 | Change "suite" to --suited--. |
| Col. 1, line 50 | Change "cnverted" to --converted--. |
| Col. 4, line 41 | Change "an" to --and--. |
| Table II, Col. 5, line 51 | Change "g cm$^3$" to --g/cm$^3$--. |
| Claim 17, Col. 8, line 1 | Change "preparinq" to --preparing--. |
| Claim 17, Col. 8, line 1 | Change "qranules" to --granules--. |

Signed and Sealed this

Sixteenth Day of May, 1989

Attest:

DONALD J. QUIGG

Attesting Officer

Commissioner of Patents and Trademarks